Sept. 19, 1967
C. B. KREKELER
3,342,532
CUTTING TOOL COMPRISING HOLDER FREELY
ROTATABLE IN SOCKET WITH BIT
FRICTIONALLY ATTACHED
Filed March 15, 1965
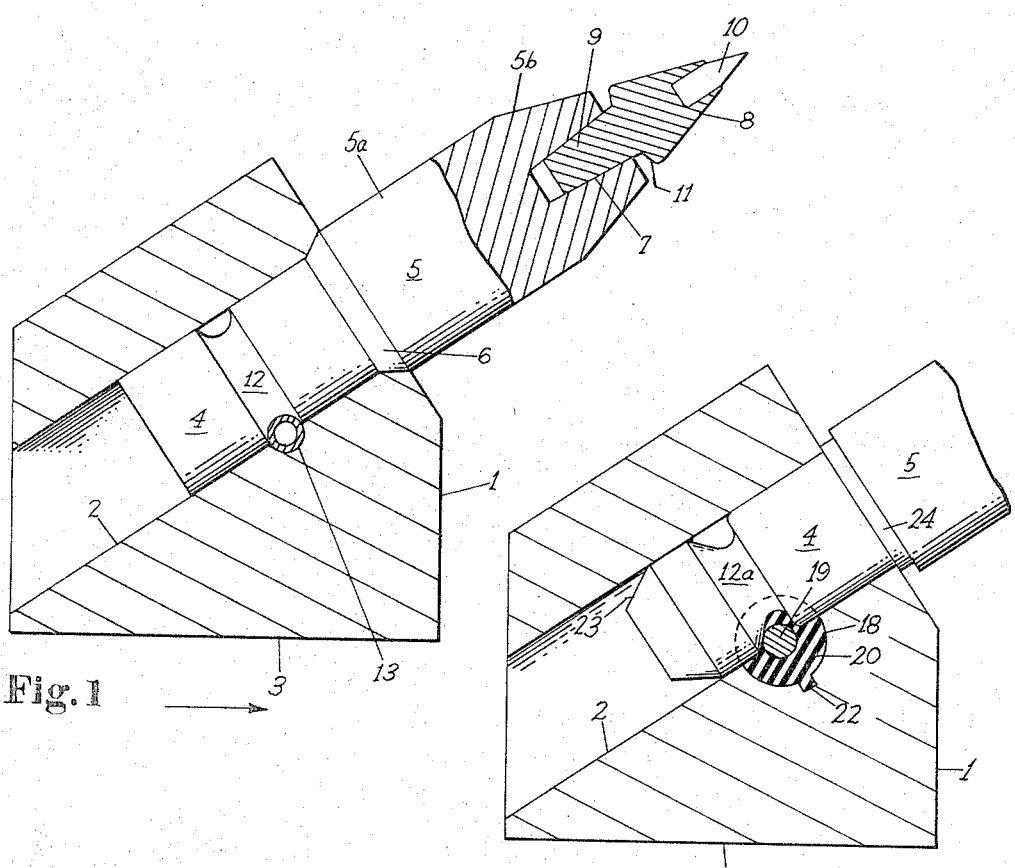
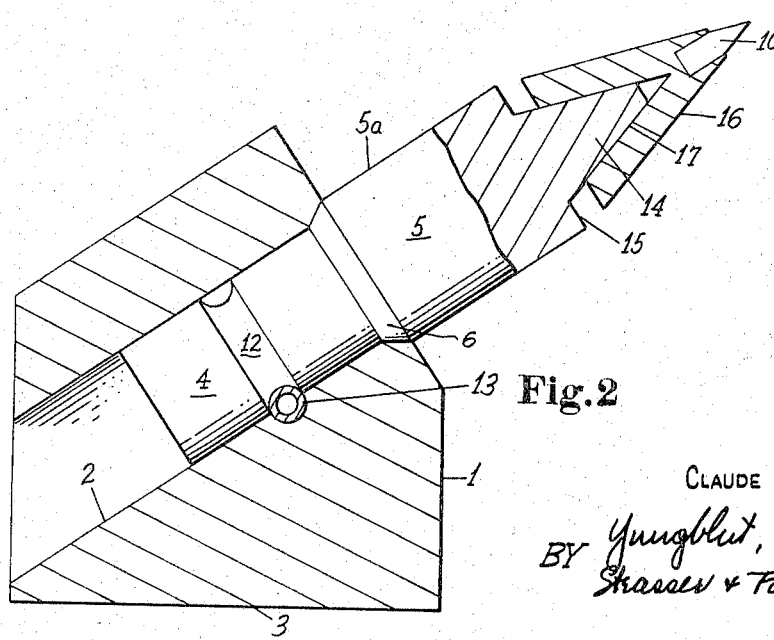
INVENTOR,
Claude B. Krekeler,
BY Yungblut, Melville,
Strasser & Foster,
ATTORNEYS.

United States Patent Office 3,342,532
Patented Sept. 19, 1967

3,342,532
CUTTING TOOL COMPRISING HOLDER FREELY ROTATABLE IN SOCKET WITH BIT FRICTIONALLY ATTACHED
Claude B. Krekeler, Hamilton County, Ohio, assignor to The Cincinnati Mine Machinery Co., Cincinnati, Ohio, a corporation of Ohio
Filed Mar. 15, 1965, Ser. No. 439,586
12 Claims. (Cl. 299—92)

ABSTRACT OF THE DISCLOSURE

A cutting tool for use in mining machines of the type having mounting means for a plurality of cutting tools, the mounting means having shank receiving perforations therein and shank retaining means in association therewith. The cutting tool comprises a cutter bit with a body tapered to a hard cutting point, and a bit holder having a head portion and a shank portion receivable in and freely rotatable within a mounting means. Coacting means on the bit and bit holder provide a frictional engagement between these elements.

This application is related to the copending application of the same inventor entitled, Cutter Bits of Heavy Construction and Means for Mounting Them, Ser. No. 432,981, filed Feb. 16, 1965.

Considerable interest has recently been shown in the mining industry in cutting bits and socket members wherein the bit has a conical or tapering head and a cylindrical shank, the bit being so mounted by means of the cylindrical shank in a driven lug or socket member that the axis of the bit lies at an angle of less than 90° to the direction of motion of the bit in the cutting operation. Bits of the type referred to sustain the cutting stresses more nearly in line with their axes, and are therefore less subject to breakage. Moreover, such bits, generally provided with a hard alloy cutting tip, wear longer, are capable of carrying larger cutting tips, and use the cutting tip to better advantage and more completely before a change of bits is required. The mountings of some of these bits are such that there may be a slow turning action of the bit during the cutting operation, which produces more even wear. Finally such bits may be made in relatively large sizes for heavy duty; and while size does not constitute a limitation on the invention, the advent of large, elaborate mining machines which have cutting heads or cutting arms and are capable of operating upon the face of a seam of coal, for example, cutting the coal and transporting it through the machine to a conveyor or to mine cars, has made the provision of heavy duty cutter bits a matter of increasing importance.

Bits of the type indicated, having tapered or conical heads nevertheless possess certain disadvantages. The cutting stresses are great, the bits lose their cutting power fairly rapidly, and frequent bit changes are necessary. Since the bits, when too dull for resharpening, are normally discarded as scrap metal, the large size and heavy cross section of many of these bits represents a serious cost factor. The bits themselves are expensive to manufacture; and the bit changing operation may be difficult and time-consuming.

The basic objects of this invention relate to the provision of improvements in cutter bits leading to lessened overall cost and savings in operations when the bits must be changed.

Other and ancillary objects of the invention will be pointed out hereinafter or will be clear to the skilled workers in the art upon reading these specifications; and they are accomplished by that certain structure and arrangement of parts of which certain exemplary embodiments will now be described. Reference is made to the accompanying drawings wherein:

FIG. 1 is an elevational view with parts in section showing a structure comprising a lug or socket member, a bit holder and a bit having a shank to engage in a recess in the top of the bit holder.

FIG. 2 is an elevational view with parts in section showing a structure in which the bit is of hollow tapered configuration, the bit holder having a nose to engage in the hollow of the bit.

FIG. 3 is a similar view in which the bit holder is held in the socket member or lug by means of a resilient releasable retainer such as that shown in applicant's United States Patent No. 2,965,365, issued Dec. 20, 1960.

In the practice of this invention, use is made of a lug or socket member 1 as in FIG. 1 having a perforation 2 therein to receive the shank of a bit holder later described. The lug has a base 3 by which it may be attached or welded to a cutting wheel, a cutting head, a cutting arm, the links of a cutting chain, or any other means by which the bit may be moved under power in the cutting direction. While a separate lug or socket member has been shown, it does not constitute a departure from the spirit of this invention to engage the shank of the bit holder in a suitable recess formed directly in a cutting wheel or cutting arm.

Since wear may occur on the means for mounting the tool holder, the use of lugs is preferred because they may be renewed as required. Assuming that the lug is driven in the direction of the arrow in FIG. 1, the axis of the perforation 2 will lie at an angle to the direction of movement, the angle being less than 90° and of such magnitude that the tip of the bit will lie above the highest part of the lug. In other words, the bit will be so positioned that it will cut away the material being mined before uncut material can contact the lug.

The bit holder in FIG. 1 comprises a shank member 4 which is integral and coaxial with a head member 5. Between the two parts of the bit holder there is an abutment means 6, which, contacting the lug at or adjacent the forward face of the lug will establish the gauge of the bit, i.e. the depth to which the shank 4 of the bit holder will enter the perforation 2.

The head 5 of the bit holder preferably has a cylindrical portion 5a and a tapered portion 5b, although if desired the entire head portion of the bit holder may be tapered from the abutment means 6 toward the outer end of the bit holder. The head 5 has a tapered recess 7 preferably in the form of a truncated cone.

The bit proper is a relatively small device having a tapered head portion 8 and a conical or tapered shank 9. The bit is provided with a hard alloy cutting tip 10 which may be embedded in the hard steel of the bit and brazed in place. It is possible in the practice of this invention to make the entire bit of a hard alloy, if desired. The entire bit is of comparatively small volume so that the extra cost of the hard alloy would not prevent the use of the modification just set forth. But, it is characteristic of hard alloy materials that they tend to be brittle so that danger of breakage is increased.

The tapered shank 9 of the bit fits within the tapered recess 7 of the bit holder and is held there by a wedging action. It has been found that if the surfaces of the tongue 9 and recess 7 lie at an angle of about 11° or 12° to the axis of the bit and bit holder, there will be a sufficient frictional effect to prevent loss of the bit by centrifugal force or other accidental forces. While the term "conical" has been used in connection with the surfaces 5b and 7 of the bit holder and the head 8 and shank 9 of the bit, these elements may have other configurations in cross section, including oval configurations and the configurations of any geometrical polygons.

It will be noted in FIG. 1, that the lower edge or skirt of the bit head 8 is so configured as to leave a space 11 between it and the end of the bit holder head. Thus it becomes possible to remove the bit from the bit holder by means of a prying tool inserted in the recess. A new bit may be readily installed by inserting its shank 9 in the recess 7 and striking the bit lightly with a tool faced with softer material than the cutting alloy 10 so as to effect the frictional gripping action previously described without injury to the cutting tip.

The shank 4 of the bit holder is preferably provided with an annular grove 12 so that it may be held in the perforation 2 of the lug by a pin 13 or other suitable engaging means. The advantages of providing a cylindrical shank held in place by means engaging an annular groove is that during the cutting operation the bit and bit holder may rotate or turn slowly. This causes the bit to wear more evenly, as set forth in the copending application above recited. Advantages of the structure of this invention are that the bit holder may rotate or turn with respect to the lug, making it unnecessary for the bit to rotate with respect to the bit holder. The bit may thus be held in place by a wedging action as described, may be smaller, and requires no spring clip or other extra parts to keep it in engagement with the bit holder. The rotation of the bit holder is advantageous also because the bit holder head, being larger in diameter than the bit, is itself subject to some wear, which should be equalized. In order to increase the tendency of the bit holder and bit to rotate during the cutting operation, one or both of them may be provided with spiral configurations on their outer surfaces. These may be grooves or ridges, but should be relatively wide rather than narrow. An exemplary form or spiral configuration is illustrated in the above mentioned copending application, Ser. No. 432,981. The tendency of the bit and bit holder to rotate relative to the lug is increased by so positioning the lug that the axis of the bit and bit holder lies at a slight horizontal angle to the direction of motion during cutting, in addition to the vertical angle previously described.

In FIG. 2 like parts have been given like index numerals and need not be redescribed. The head 5 of the bit holder has the cylindrical surface 5a which terminates in a nose 14, preferably frusto-conical in shape. The base of this nose if preferably smaller than the diameter of the cylindrical surface 5a so as to provide an integral shoulder 15.

The bit in this instance is in the form of a conical member 16 having an interior hollow 17 of conical configuration into which the nose 14 of the bit holder fits. Again the bit may be made of a suitable hardenable steel and may be provided with an alloy cutting point as previously described.

In FIG. 3 like parts have again been indicated by like index numerals. FIG. 3 illustrates a structure of such character that the bit holder has a knock-in, pry-out relationship with the lug. This is preferably accomplished by the use of a resilient, releasable retaining means such as is shown in Patents Nos. 2,965,365, 3,057,609 and 3,088,721 in the name of the present inventor. Here a transverse hole 18 is formed in the lug, intersecting the perforation 2 and of a size to accept the retainer. The preferred retainer has a metallic rod 19 which is encased in an elastomeric substance 20 excepting where the hole 18 intersects the perforation 2. The resilient retainer extends beyond the perforation 2 on either side and may be as long as the thickness of the lug. If the retainer is provided with a key the hole 18 will be broached so as to present a key-way 22.

The rod 19 will engage in an annular groove 12a in the shank of the bit holder when the bit holder is fully seated in the lug. The groove may be similar to the groove 12 in FIG. 1, but preferably is so configured as to have a downwardly slanting lower surface so that when the rod 19 engages that surface a downward force will be exerted on the bit holder shank. In order to permit the bit holder to be installed by driving, it will be necessary to taper or relieve the lower end portion of the bit holder shank as at 23 so that this surface will initially depress the rod 19.

Since the structure of FIG. 3 is a knock-in, pry-out structure, provision should be made for engaging a removing tool with the head. This may conveniently be done by providing a spacing element 24, which is larger in diameter than perforation 2 so that it can act as a gauging means, but is smaller than the diameter of the head of the bit holder. Thus a prying tool may be engaged between the forward surface of the lug and the under surface of the head so as to remove the bit holder from the lug. The upper part of the bit holder may be configured as in either FIGS. 1 or 2 and used with the appropriate bit structures shown in these figures.

Modifications may be made in the invention without departing from the spirit of it.

The embodiments of the invention in which an exclusive property or privilege is claimed are defined as follows:

1. A cutting tool for use in mining machines of the type having means for mounting a plurality of cutting tools and for moving said cutting tools in a cutting direction against the face of a mineral to be cut, said mounting means having shank receiving perforations therein, and shank retaining means in association therewith, said cutting tool comprising a replaceable bit and a bit holder, said bit holder having axially aligned shank and head portions, said shank portion having a circular cross section and being so configured as to be received in and freely rotatable within a shank receiving perforation of said mounting means, said bit having a body with an outer end, an outer surface on said bit body tapering toward said outer end, a hard cutting point at said outer end of said body, coacting means on said bit holder head and said bit for frictionally engaging said bit with said bit holder head, and cooperating surfaces on said bit body and said bit holder head spaced from each other for the insertion therebetween of a prying tool for the removal of said bit from said bit holder.

2. The structure claimed in claim 1 wherein a portion at least of said bit holder head is tapered and wherein the body of said bit substantially continues the tapered portion of said head.

3. The structure claimed in claim 1 wherein a portion at least of said bit holder head is tapered and wherein the body of said bit substantially continues the tapered portion of said head, and wherein said bit body has a tapered shank, the head of said bit holder having a tapered recess to receive said shank.

4. The structure claimed in claim 1 wherein a portion at least of said bit holder head is tapered and wherein the body of said bit substantially continues the tapered portion of said head, and wherein said bit body has a tapered shank, the head of said bit holder having a tapered recess to receive said shank, the said bit shank having a smaller diameter than the head of said bit, and the parts being so configured that a space is left between the head of said bit and the outer end of said bit holder for the insertion of a prying tool.

5. The structure claimed in claim 1 wherein the shank of said bit holder is provided with an annular groove intermediate its ends.

6. The structure claimed in claim 1 wherein the head of said bit holder has a forwardly extending tapered nose, and wherein said bit has a tapered hollow formed therein to engage the tapered nose of said bit holder frictionally.

7. The structure claimed in claim 1 wherein the head of said bit holder has a forwardly extending tapered nose, and wherein said bit has a tapered hollow formed therein to engage the tapered nose of said bit holder frictionally, the tapered nose of said bit holder having a lesser diameter than the head thereof, the configuration of the parts being such that the outer surface of said bit is substantially a continuation of the outer surface of said head.

8. The structure claimed in claim 1 wherein the head of said bit holder has a forwardly extending tapered nose, and wherein said bit has a tapered hollow formed therein to engage the tapered nose of said bit holder frictionally, the forwardly extending tapered nose of said bit holder having a lesser diameter than the head thereof, so as to form a shoulder on said head of said bit holder the configuration of the parts being such that the outer surface of said bit is substantially a continuation of the outer surface of said head, the said bit having a lower edge which upon engagement of the parts is spaced from the said shoulder said shoulder on said bit holder and said lower edge of said bit comprising said spaced cooperating surfaces.

9. The structure claimed in claim 1 wherein the head of said bit holder has a diameter larger than the diameter of said bit holder shank whereby to provide gauging means.

10. The structure claimed in claim 1 in combination with a mounting means having a perforation to receive said shank and fitted with a resilient retaining means, said retaining means having an engagement portion extending within said perforations, the shank of said bit holder having an annular groove so located that the said engagement portion may enter it, said bit holder being rotatable with respect to said mounting means.

11. The structure claimed in claim 5 in combination with a mounting means having a perforation to receive said bit holder and a means for engagement in said groove to prevent axial withdrawal of the bit holder shank from said perforation, the said bit holder being rotatable with respect to said lug.

12. The structure claimed in claim 10 wherein the shank of said bit holder is relieved at its end, whereby to depress the engagement portion of said resilient retaining means.

References Cited

UNITED STATES PATENTS

| | | | |
|---|---|---|---|
| 1,774,006 | 8/1930 | Hess | 299—91 X |
| 2,307,507 | 1/1943 | Hutton | 287—119 |
| 3,063,691 | 11/1962 | Osgood | 299—92 |
| 3,268,260 | 8/1966 | Snipe | 299—91 |

FOREIGN PATENTS

| | | |
|---|---|---|
| 784,534 | 7/1935 | France. |
| 867,381 | 2/1953 | Germany. |

ERNEST R. PURSER, *Primary Examiner.*